(12) United States Patent
Reckzeh et al.

(10) Patent No.: US 9,145,199 B2
(45) Date of Patent: Sep. 29, 2015

(54) HIGH LIFT SYSTEM FOR AN AIRCRAFT WITH A HIGH LIFT FLAP AND METHOD FOR ADJUSTING THE HIGH LIFT FLAP

(75) Inventors: Daniel Reckzeh, Stuhr (DE); Klaus Schindler, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 757 days.

(21) Appl. No.: 13/061,176

(22) PCT Filed: Aug. 28, 2009

(86) PCT No.: PCT/EP2009/006271
§ 371 (c)(1),
(2), (4) Date: Feb. 28, 2011

(87) PCT Pub. No.: WO2010/022978
PCT Pub. Date: Mar. 4, 2010

(65) Prior Publication Data
US 2011/0163204 A1 Jul. 7, 2011

Related U.S. Application Data

(60) Provisional application No. 61/092,411, filed on Aug. 28, 2008.

(30) Foreign Application Priority Data

Aug. 28, 2008 (DE) .......................... 10 2008 044 750

(51) Int. Cl.
*B64C 9/24* (2006.01)
*B64C 9/28* (2006.01)

(52) U.S. Cl.
CPC ... *B64C 9/24* (2013.01); *B64C 9/28* (2013.01); *Y02T 50/32* (2013.01)

(58) Field of Classification Search
CPC ............ Y02T 50/32; B64C 9/22; B64C 9/02; B64C 9/24; B64C 9/16; B64C 9/28
USPC .......................... 244/213, 214, 216, 218, 219
See application file for complete search history.

(56) References Cited

U.S. PATENT DOCUMENTS

| 5,056,741 A | * | 10/1991 | Bliesner et al. ............... 244/214 |
| 5,544,847 A | | 8/1996 | Bliesner |
| 5,681,013 A | | 10/1997 | Rudolph |
| 5,839,699 A | * | 11/1998 | Bliesner ....................... 244/214 |

FOREIGN PATENT DOCUMENTS

| CN | 1982157 | 6/2007 |
| CN | 101198520 | 6/2008 |

(Continued)

OTHER PUBLICATIONS

PCT International Preliminary Report on Patentability, Application No. PCT/EP2009/006271, Issued Mar. 1, 2011.
Chinese Office Action for Application No. 200980133901.5 dated Feb. 4, 2013.
PCT International Search Report, prepared by European Patent Office, Application No. PCT/EP2009/006271 (publication WO 2010/022978), Mailed May 27, 2010.

(Continued)

*Primary Examiner* — Valentina Xavier
(74) *Attorney, Agent, or Firm* — Jenkins, Wilson, Taylor & Hunt, P.A.

(57) ABSTRACT

A high lift system for an aircraft with at least one high lift flap arranged on each of the main wings of the aircraft. The high lift system includes an input device for the generation of flight phase-related requirements for the high lift flap. The high lift system further includes a control device, with a conversion function with which the flight phase-related requirements are converted into setting commands for the actuation of a lift device for the adjustment of the high lift flap. The conversion function is configured such that from a take-off requirement, a setting command to the drive device is generated with which the leading edge flap of the high lift flap is arranged in a set state in which a gap exists between the leading edge flap and the main wing with a gap width of between 0.1% and 0.4% relative to the local wing chord.

7 Claims, 1 Drawing Sheet

(56) References Cited

FOREIGN PATENT DOCUMENTS

| | | |
|---|---|---|
| DE | 694 25 670 | 12/2000 |
| DE | 602 02 924 | 5/2006 |
| DE | 10 2008 044 750 | 3/2010 |
| EP | 1310848 | 5/2003 |
| FR | 1395340 | 4/1965 |
| WO | WO 2010/022978 | 3/2010 |

OTHER PUBLICATIONS

European Office Action for Application No. 09 778 200.7-2422 dated Jan. 28, 2013.
German Office Action for Application No. 10 2008 044 750.1 dated Feb. 23, 2012.

* cited by examiner

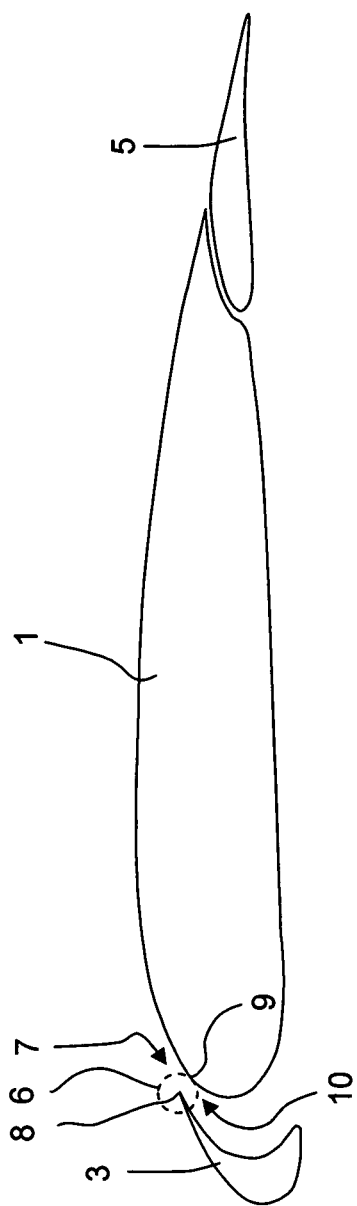

HIGH LIFT SYSTEM FOR AN AIRCRAFT WITH A HIGH LIFT FLAP AND METHOD FOR ADJUSTING THE HIGH LIFT FLAP

RELATED APPLICATIONS

The present application is a national stage entry according to 35 U.S.C. §371 of PCT application No.: PCT/EP2009/006271 filed on Aug. 28, 2009, which claims priority from U.S. Provisional Application No. 61/092,411, filed on Aug. 28, 2008, and from German application No.: 10 2008 044 750.1, filed on Aug. 28, 2008.

FIELD OF THE INVENTION

The invention relates to a high lift system for an aircraft with at least one high lift flap arranged on each of the main wings of the aircraft, and also to a method for the setting of at least one high lift flap arranged on each of the main wings of an aircraft.

BACKGROUND

From U.S. Pat. No. 5,544,847 a high lift system is of known art, in which for the improvement of the lift characteristics of a wing its wing thickness is defined.

U.S. Pat. No. 5,839,699 A discloses a combination of a wing and a slat which is positioned in a take-off/climb position such that the trailing edge of the slat is in contact with or closely adjacent to the forward concealed nose and upper surface portion such that a concealed forward nose and upper surface portion is provided.

EP 1 310 848 A1 describes an aircraft high lift control system comprising several controllers which are split into two similar groups in order to provide a fail-safe configuration.

SUMMARY

An object of embodiments of the invention is to provide a high lift system and a method for the setting of at least one high lift flap arranged on each of the main wings of an aircraft, which in each case presents a favourable lift configuration for take-off.

In accordance with an embodiment of the invention a gap is provided between the leading edge flap and the main wing, with a gap width of between 0.1% and 0.4% relative to the local wing chord. As take-off configurations for today's aircraft either a configuration is provided in which no gap occurs between the leading edge flap and the main wing, or a configuration is provided in which a gap between the leading edge flap and the main wing occurs, whose magnitude is more than 0.8% of the local wing chord. In the case of take-off configurations without a gap between the leading edge flap and the main wing, however, the separation of the flow in the wing chord direction is not effectively delayed. For this reason a take-off configuration has been provided in other applications in which a relatively large gap between the leading edge flap and the main wing is present with a magnitude of more than 0.8% of the local wing chord. In accordance with an embodiment of the invention, however, just a relatively small gap is provided between the leading edge flap and the main wing as a take-off configuration, since surprisingly it has been found that with such a relatively small gap a boundary layer forms on the main wing within the gap, which outside the gap joins up with the boundary layer of the main wing, and modifies the boundary layer profile forming on the main wing such that compared with a profile with a large gap width (>0.8%) the drag is reduced to the level of a profile with a closed gap. Furthermore, however, compared with the profile with a closed gap the maximum lift can be increased, and the aerodynamic load on the leading edge slat can be reduced.

In accordance with an embodiment of the invention in particular a high lift system for an aircraft with at least one high lift flap is arranged on each of the main wings of the aircraft, having:
- a pilot input device for the generation of flight phase-related requirements for the at least one high lift flap, wherein at least one take-off requirement belongs to these requirements,
- a control device functionally connected with the pilot input device, with a conversion function with which the flight phase-related requirements are converted into setting commands for the actuation of a lift device for the adjustment or setting of the set states of the at least one high lift flap, wherein one specifiable flight phase is the take-off phase.

The conversion function of the control device is configured such that from a take-off requirement this generates a setting command to the drive device, with which the leading edge flap of the at least one high lift flap is arranged in a set state in which a gap exists between the leading edge flap and the main wing with a gap width of between 0.1% and 0.4% relative to the local wing chord.

In accordance with an embodiment of the invention a method is also provided for the setting of at least one high lift flap arranged on each of the main wings of the aircraft, with the steps:
- generation of a flight phase-related requirement for the at least one high lift flap, wherein this requirement contains at least one take-off requirement,
- conversion of the at least one flight phase-related requirement into a setting command for the actuation of a drive device and the adjustment or modification of the set state of the at least one high lift flap, wherein the flight phase-related requirement is a take-off requirement for the take-off phase of the aircraft, and on the basis of the take-off requirement a setting command to the drive device is generated with which a leading edge flap of the at least one high lift flap is arranged in a set state in which a gap exists between the leading edge flap and the main wing with a gap width of between 0.1% and 0.4% relative to the local wing chord.

Here provision can be made that additionally in the take-off requirement a trailing edge flap is arranged in an extended set state.

The take-off requirement can be manually selected with the pilot input device.

Alternatively or additionally provision can be made that an automatic flight mode can be selected with the pilot input device, which automatically generates the take-off requirement.

BRIEF DESCRIPTION OF THE DRAWING

In what follows examples of embodiment of the invention are described with the aid of the accompanying FIG. 1, which shows a cross-sectional representation of a main wing with a leading edge flap or slat, and a trailing edge flap, which are arranged on the main wing.

DESCRIPTION

FIG. 1 shows a main wing 1 with a leading edge flap 3 in a refracted state, and a trailing edge flap 5 in an extended state.

In accordance with an embodiment of the invention a gap 7 arises between the main wing 1 and the leading edge flap 3, at least over part of the setting range of the leading edge flap 3. The magnitude 10 of a gap 7 existing in a set state of the leading edge flap 3 ensues from the radius of a smallest circle 6 that is formed around the trailing edge 8 of the leading edge flap 3 as a central point, and touches a point on the surface of the main wing 1. In FIG. 1 the point of contact 9 on the surface of the main wing 1 thereby ensues.

The high lift system for an aircraft in accordance with an embodiment of the invention has at least one high lift flap arranged on each of the main wings 1 of the aircraft. The at least one high lift flap can be implemented by means of at least one leading edge flap 3 per wing, and optionally at least one trailing edge flap 5 per wing. The high lift system has furthermore a pilot input device for the generation of flight phase-related requirements for the at least one high lift flap.

At least one take-off requirement can be provided as requirements of the pilot input device. Optionally at least one take-off requirement can be provided as a requirement of the pilot input device. Here the pilot input device can be embodied such that the take-off requirement can be manually selected. In one example of embodiment provision can be made that the pilot selects a take-off setting with the pilot input device for the set state of the high lift flap, and in particular of the leading edge flap 3, which is commanded via the pilot input device. Alternatively or additionally the take-off requirement can be automatically generated with the pilot input device on the basis of an assigned function. Here the pilot input device can have an automatic flight mode that generates the take-off requirement. Alternatively or additionally the pilot input device can be functionally connected with a function or a module that has an automatic flight mode that generates the take-off requirement. Such an automatic flight mode can be an autopilot function. This can be an automatic take-off function or a function for purposes of flying a flight phase that includes a take-off. Here provision can be made that the autopilot function is part of the pilot input device, or is integrated in a module that is separate from the latter. The take-off requirement can also be directly one or the take-off setting of a leading edge flap 3. In one example of embodiment just one take-off requirement is generated by means of a manual input or by means of an automatic function on the basis of selection of an autopilot function.

A control device with a conversion function is functionally connected with the pilot input device, with which function the flight phase-related requirements are converted into setting commands for the actuation of a drive device for the adjustment or setting of the set states of the at least one high lift flap 3, and the at least one leading edge flap 3. The control device or conversion function thereby contains the flight phase-related requirements from the pilot input device, or, in the case of the example of embodiment with an autopilot function, from this autopilot function.

In accordance with an embodiment of the invention the conversion function of the control device is configured such that on receipt of a take-off requirement this generates a setting command to the drive device, with which the at least one leading edge flap 3 is arranged in a set state in which a gap exists between the leading edge flap 3 and the main wing 1 with a gap width of between 0.1% and 0.4% relative to the local wing chord. In accordance with an embodiment of the invention this range of gap widths is maintained over the span of the leading edge flap 3. In one particular example of an embodiment, an individual take-off setting can be provided in which this range of gap widths is adjusted.

In this context the local wing chord is understood to be the local wing chord at the location of the gap in question, with the leading edge flap 3 retracted and, when a trailing edge flap 5 is present, with the trailing edge flap 5 also retracted.

In accordance with an embodiment of the invention provision can also be made that in the take-off requirement the leading edge flap 3 is arranged at a setting angle in the range between 10 and 22 degrees.

In the take-off requirement provision can furthermore be made that on the basis of the take-off requirement the conversion function of the control device generates a setting command for a trailing edge flap 5, on the basis of which the drive device additionally arranges the trailing edge flap 5 in an extended set state. In addition provision can be made that in the take-off requirement the trailing edge flap 5 is arranged at a setting angle in the range between 10 and 30 degrees.

The "arrangement" of the leading edge flap 3 and/or the trailing edge flap 5 on the basis of the take-off requirement signifies that the leading edge flap 3 and/or the trailing edge flap 5 is moved into the indicated set state, if the leading edge flap 3 and/or the trailing edge flap 5 is not yet in this set state, or that this set state of the leading edge flap 3 and/or the trailing edge flap 5 is maintained if the leading edge flap 3 and/or the trailing edge flap 5 is already located in this set state.

In accordance with an embodiment of the invention a method is also provided for the setting of at least one high lift flap 3 arranged on each of the main wings 1 of an aircraft. Flight phase-related requirements are thereby generated for the at least one high lift flap 3, wherein at least one take-off requirement and optionally one or a plurality of landing requirements belong to these requirements. The flight phase-related requirements are furthermore converted into setting commands for the actuation of a drive device and the adjustment or setting of the set states of the at least one high lift flap 3, wherein one specifiable flight phase is in particular the take-off phase, and the requirement is a take-off requirement with which a setting command to the drive device is generated. On the basis of these commands a leading edge flap 3 of the at least one high lift flap, is arranged in a set state, or can be moved into this state, in which a gap exists between the leading edge flap 3 and the main wing 1, with a gap width of between 0.1% and 0.4% relative to the local wing chord.

In the method provision can be made that additionally in the take-off requirement a trailing edge flap 5 is arranged in an extended set state.

As set out above provision can be made that the take-off requirement can be manually selected with the pilot input device, or that an automatic flight mode can be selected with the pilot input device, which mode automatically generates the take-off requirement.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A high lift system for an aircraft with at least one high lift flap arranged on each main wing of the aircraft, the high lift system comprising:

a pilot input device for generation of flight phase-related requirements for the at least one high lift flap, wherein at least one take-off requirement belongs to these requirements, a control device functionally connected with the pilot input device, with a conversion function with which the flight phase-related requirements are converted into setting commands for actuation of a drive device for adjustment or setting of the set states of the at least one high lift flap, wherein one specifiable flight phase is a take-off phase, wherein, on a basis of a take-off requirement, a leading edge flap of the at least one high lift flap comprises a configuration where the leading edge flap is arranged in a set state in which a gap exists between the leading edge flap and the main wing with a gap width of between 0.1% and 0.4% relative to a local wing chord which is provided over a spanwise direction so that drag is reduced to a level corresponding to a sealed slat and maximum lift is increased with regard to the sealed slat while an aerodynamic load on the slat is reduced.

2. The high lift system in accordance with claim 1, wherein in the take-off requirement the leading edge flap is arranged at a setting angle in a range between 10 and 22 degrees.

3. The high lift system in accordance with claim 1, wherein additionally in the take-off requirement a trailing edge flap is arranged in an extended set state.

4. The high lift system in accordance with claim 3, wherein in the take-off requirement the trailing edge flap is arranged at a setting angle in a range between 10 and 30 degrees.

5. The high lift system in accordance with claim 1, wherein the take-off requirement can be manually selected with the pilot input device.

6. The high lift system in accordance with claim 1, wherein an automatic flight mode can be selected with the pilot input device, which mode automatically generates the take-off requirement.

7. The high lift system in accordance with claim 5, wherein an automatic flight mode can be selected with the pilot input device, which mode automatically generates the take-off requirement.

* * * * *